US 6,711,238 B1

(12) United States Patent
Manning et al.

(10) Patent No.: US 6,711,238 B1
(45) Date of Patent: *Mar. 23, 2004

(54) PARALLEL-CONNECTED DIALING SIGNAL TRANSMISSION INHIBITING DEVICE FOR DATA TRANSFER OVER A TELEPHONE LINK

(75) Inventors: Frank B. Manning, Boston, MA (US); William Hume Vance, Somerville, MA (US)

(73) Assignee: Zoom Telephonics, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/235,529

(22) Filed: Jan. 22, 1999

Related U.S. Application Data

(63) Continuation of application No. 08/542,661, filed on Oct. 13, 1995, now Pat. No. 5,898,756.

(51) Int. Cl.[7] .......................... H04M 1/24; H04M 3/08; H04M 3/22
(52) U.S. Cl. ............... 379/31; 379/167.01; 379/167.11; 379/167.12; 379/171; 379/172; 379/173
(58) Field of Search .......................... 379/31, 111–114, 379/120, 127, 133–134, 167–173, 177–179, 182–183, 184, 187, 201

(56) References Cited

U.S. PATENT DOCUMENTS

| 3,780,228 A | 12/1973 | Stewart ..................... 179/16 A |
| 3,786,196 A | 1/1974 | Gresham ............... 179/18 DA |
| 3,920,936 A | 11/1975 | Mogtader .............. 179/18 DA |
| 3,976,846 A | 8/1976 | Sekiguchi et al. ..... 179/18 DA |
| 4,072,824 A | 2/1978 | Phillips .................... 179/18 B |
| 4,143,247 A | 3/1979 | Yoshitoshi et al. ....... 179/81 R |
| 4,177,358 A | 12/1979 | Mason ................... 179/18 DA |
| 4,188,508 A | 2/1980 | Rogers et al. ......... 179/18 DA |
| 4,215,246 A | 7/1980 | Sawyer ..................... 179/18 B |
| 4,246,445 A | 1/1981 | Hayasaka et al. ...... 179/18 DA |
| 4,251,692 A | * 2/1981 | Waldman |
| 4,262,171 A | * 4/1981 | Schneider et al. |
| 4,332,982 A | 6/1982 | Thomas ................... 179/7.1 R |
| 4,332,985 A | 6/1982 | Samuel ................... 179/90 BD |
| 4,336,422 A | 6/1982 | Mellon .................. 179/18 DA |
| 4,346,264 A | 8/1982 | Sharvit .................. 179/18 DA |
| 4,358,640 A | 11/1982 | Murray ..................... 179/90 D |

(List continued on next page.)

FOREIGN PATENT DOCUMENTS

| CA | 1 132 276 | 9/1982 | ............ H04M/1/66 |
| WO | 85/00716 | 2/1985 | ............ H04M/1/66 |

*Primary Examiner*—Duc Nguyen
(74) *Attorney, Agent, or Firm*—Hamilton, Brook, Smith & Reynolds, PC (57) ABSTRACT

A parallel-connected dialing signal detection and transmission-inhibiting device is disclosed which detects dual-tone multi-frequency dialing signals across tip and ring conductors of a telephone link and switches in an a.c. load that attenuates the dialing signals by at least 30 dB. This prevents action in response to the DTMF signals by a central office servicing the telephone link, thereby allowing commands-data to be transmitted within the home telephone wiring. Such commands can be used to invoke a speed/auto dialing function, to provide an intercom, to control appliances, etc. To allow fast response, the controller charges a capacitor of the a.c. load by connecting it across the tip and ring conductors in response to an off-hook condition. Then it is disconnected to allow a dial tone to reach a user at the telephone. Further transparency is provided by the fact that a single interfacing capacitor connects both the dialing signal detector and a tone generator to the tip line. This reduces the loading on the tip line by the device during periods when users are conversing on the telephone link.

9 Claims, 4 Drawing Sheets

U.S. PATENT DOCUMENTS

| | | | | |
|---|---|---|---|---|
| 4,412,353 A | | 10/1983 | Itoh | 455/323 |
| 4,453,040 A | | 6/1984 | Wolf et al. | 179/81 C |
| 4,459,434 A | | 7/1984 | Benning et al. | 179/81 B |
| 4,468,529 A | | 8/1984 | Samuel et al. | 179/18 BA |
| 4,482,786 A | | 11/1984 | Flynn, Jr. | 179/90 B |
| 4,482,787 A | | 11/1984 | Sagara et al. | 179/90 D |
| 4,485,274 A | | 11/1984 | Jordon et al. | 179/90 BD |
| 4,511,765 A | | 4/1985 | Kuo | 179/90 BD |
| 4,567,328 A | | 1/1986 | Carrasco et al. | 179/2 |
| 4,612,419 A | | 9/1986 | Smith | 179/90 D |
| 4,683,583 A | | 7/1987 | Kossor | 379/200 |
| 4,712,230 A | | 12/1987 | Rice et al. | 379/112 |
| 4,737,981 A | | 4/1988 | Hoberman et al. | 379/112 |
| 4,794,642 A | | 12/1988 | Arbabzadah et al. | 379/200 |
| 4,866,762 A | | 9/1989 | Pintar | 379/200 |
| 4,893,335 A | | 1/1990 | Fuller et al. | 379/200 |
| 4,899,378 A | * | 2/1990 | Hamer | 379/177 |
| 4,926,470 A | | 5/1990 | Sanford | 379/199 |
| 4,947,422 A | | 8/1990 | Smith et al. | 379/200 |
| 4,965,459 A | | 10/1990 | Murray | 379/189 |
| 4,993,062 A | | 2/1991 | Dula et al. | 379/88 |
| 4,996,709 A | * | 2/1991 | Heep et al. | 379/159 |
| 5,018,190 A | | 5/1991 | Walker et al. | 379/95 |
| 5,200,995 A | | 4/1993 | Gaukel et al. | 379/200 |
| 5,267,306 A | | 11/1993 | Hagan | 379/352 |
| 5,309,508 A | | 5/1994 | Rosen | 379/142 |
| 5,548,635 A | * | 8/1996 | Bradley et al. | |
| 5,590,182 A | * | 12/1996 | Stevens et al. | |
| 5,619,553 A | * | 4/1997 | Young et al. | |
| 5,710,808 A | * | 1/1998 | Eaton | 379/201 |
| 5,740,235 A | * | 4/1998 | Lester et al. | 379/170 |
| 5,898,756 A | | 4/1999 | Manning et al. | 379/31 |

* cited by examiner

PARALLEL-CONNECTED DIALING SIGNAL TRANSMISSION INHIBITING DEVICE FOR DATA TRANSFER OVER A TELEPHONE LINK

RELATED APPLICATION

This application is a continuation of Ser. No. 08/542,661, U.S. Pat. No. 5,898,756 filed Oct. 13, 1995, the entire teachings of wich are incorporated herein by reference

BACKGROUND OF THE INVENTION

Call function devices that work for all the telephones on the telephone line, such as some speed dialers and call restrictors, are typically connected serially between the user's telephone and the telephone link to the central telephone office. In the operation of the speed dialer, dual-tone multi-frequency (DTMF) tones generated by the telephone are received by the device. If it is determined that these tones are representative of a speed dialing code, the speed dialer accesses a lookup table using the code as the address. A telephone number stored at the address is then sent over the telephone link, and the telephone is subsequently connected to the link. The keystrokes necessary to dial a full 11-digit telephone number, for example, are cut to the number of keystrokes necessary to type the code, usually three or four keystrokes. Alternatively, if the DTMF tones generated by the telephone are simply a telephone number that a user wishes to call, the speed dialer forwards the tones onto the telephone link and connects the telephone to the link. In this way, these devices add a new capability while still allowing the user to dial normally.

The principle downside of serial-connected speed dialers is the difficulty of installation. Serial connection can be made easily for one telephone, but it presents difficulties for many telephones, since there is often no modular jack available that allows a device to be plugged between the central telephone office and all of the phones on a phone line. This installation often requires an experienced technician, which increases costs.

Parallel-connected call restrictors have been proposed. These devices are usually connected in parallel to telephones across the tip and ring lines of the telephone link to block certain dialing codes. The parallel connection requires no special wiring because the parallel-connected device can plug into a modular jack connected to the phone line and work for all phones on the line. If the desired jack is being used by a telephone, a T-adapter can be used or the device can provide this function. Parallel-connected speed dialers have also been proposed. Such a dialer would be plugged into a modular jack to receive a speed dialing code from other telephones on the link. The parallel-connected dialer then generates a particular phone number that this code indicates.

SUMMARY OF THE INVENTION

Known parallel-connected call function devices, such as speed dialers or call restrictors, have suffered from a number of problems. At some point during operation, the device should load the telephone link to ensure that dialing signals generated by one of the telephones are not detected by a central office serving the link. One method for achieving this is to place an a.c. (alternating current) load across the phone link's two conductors, tip and ring. This a.c. load should severely attenuate the dialing signals on the line. Prior art specifications for the a.c. load, however, are inadequate for many real-world situations. Variability in central office sensitivity, telephone network attenuation, and dialing signal strength means that, in many common situations, the signals generated by the telephone will be detected by the central office.

Moreover, in many cases the call function devices are not transparent to the user. Some familiar aspects of telephone operation change with installation of the device, or the audio amplitude of the link deteriorates. For example, the user may no longer hear a dial tone or the fidelity of the telephone link may be impacted.

In one aspect, the present invention is directed to a parallel-connected device that inhibits the transmission of dialing signals over a telephone link. An a.c. load, preferably a series-connected capacitor and resistor, is provided to inhibit transmission by attenuation of the signals. Specifically, the signals are attenuated by at least 30 dB. This attenuation should ensure that the dialing signals will not initiate action by central offices meeting accepted specifications. In specific embodiments, higher attenuations are preferable. If one considers real-world central offices and worst-case DTMF sensitivities, attenuation of at least 38 dB is preferred.

In other aspects, the design and operation of the invention provide for transparency to the user. For example, in the time between the phone initially going off-hook and the transmission of the first DTMF signal, the user at the telephone is able to hear a normal dial tone with the present invention. This operation is deceptively difficult to achieve since the a.c. load attenuates the dial tone. This fact suggests that the load should be connected across the telephone link in response to the detection of the start of the first dialed digit. On the other hand, an a.c. load that will properly attenuate the dialing signals and that is charged by d.c. current from the central telephone office, only when thus connected, may take too long to charge up. A certain minimum voltage required by the phone's circuitry for DTMF signal generation may not be available for at least a portion of the time while the capacitor charges so the telephone may not be able to continue to generate the DTMF signal for proper detection. In the present invention, this problem is solved by connecting the a.c. load across the telephone link when a telephone's off-hook status is first detected. This charges a capacitor, the primary a.c. load. Subsequently the a.c. load is disconnected, allowing the dial tone to reach the user. The a.c. load is then reconnected only when the user begins to dial a telephone number or other code.

Further transparency is provided in certain embodiments by using a single interfacing capacitor to connect both a DTMF detector and a tone generator to the tip line. This reduces the loading on the tip line by the device during periods when users are conversing on the telephone link, thus preserving the audio quality of the telephone link, and also reduces the manufacturing cost of the device.

The invention may operate as a speed dialer generating a telephone number in response to a code entered at the telephone number pad. In other applications, the invention may select a telephone carrier in response to the dialed telephone number and forward the telephone number to the selected telephone carrier. This feature is helpful for intra-LATA toll calls in which long distance carriers often have better rates. Still other applications for the invention include transmitting DTMF signals encoding a credit card number for billing purposes when a predetermined dialing code is entered at the telephone. In another situation, the invention functions as a toll call restrictor by only allowing certain calls, such as local and "800" telephone numbers, to be sent to the central office.

In still other embodiments, the invention relies on an equalizing network to provide a dialing signal to the dialing signal detector. Because of the network, these dialing signals have the same input level whether or not the switchable load is connected to or disconnected from the telephone link. The equalizing network voltage divides the signals in response to the state of the load to help ensure that signals of the same magnitude are presented to the detector regardless of the state of the load.

According to another aspect, the invention concerns a system for transmitting information over telephone wiring of a home or office, for example. Such a system has a detector for identifying dialing signals across the tip and ring conductors of the telephone wiring. These dialing signals are typically generated by a conventional telephone also connected to the wiring. A switchable load selectively connects to the tip line to attenuate the dialing signals to prevent action by a central office connected to the telephone wiring, but a controller detects these blocked signals. If they are simply a telephone number, they are forwarded to the central office as described previously. In contrast, when it is determined through the formatting that the dialing signals are intended for the system, they are interpreted as commands.

In specific embodiments, the commands are used to control an appliance, such as a thermostat, lights, etc. In other cases, the controller uses the commands to select an intercom message, or to broadcast a spoken message from the telephone as an intercom message.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE INVENTION

Figure 1:
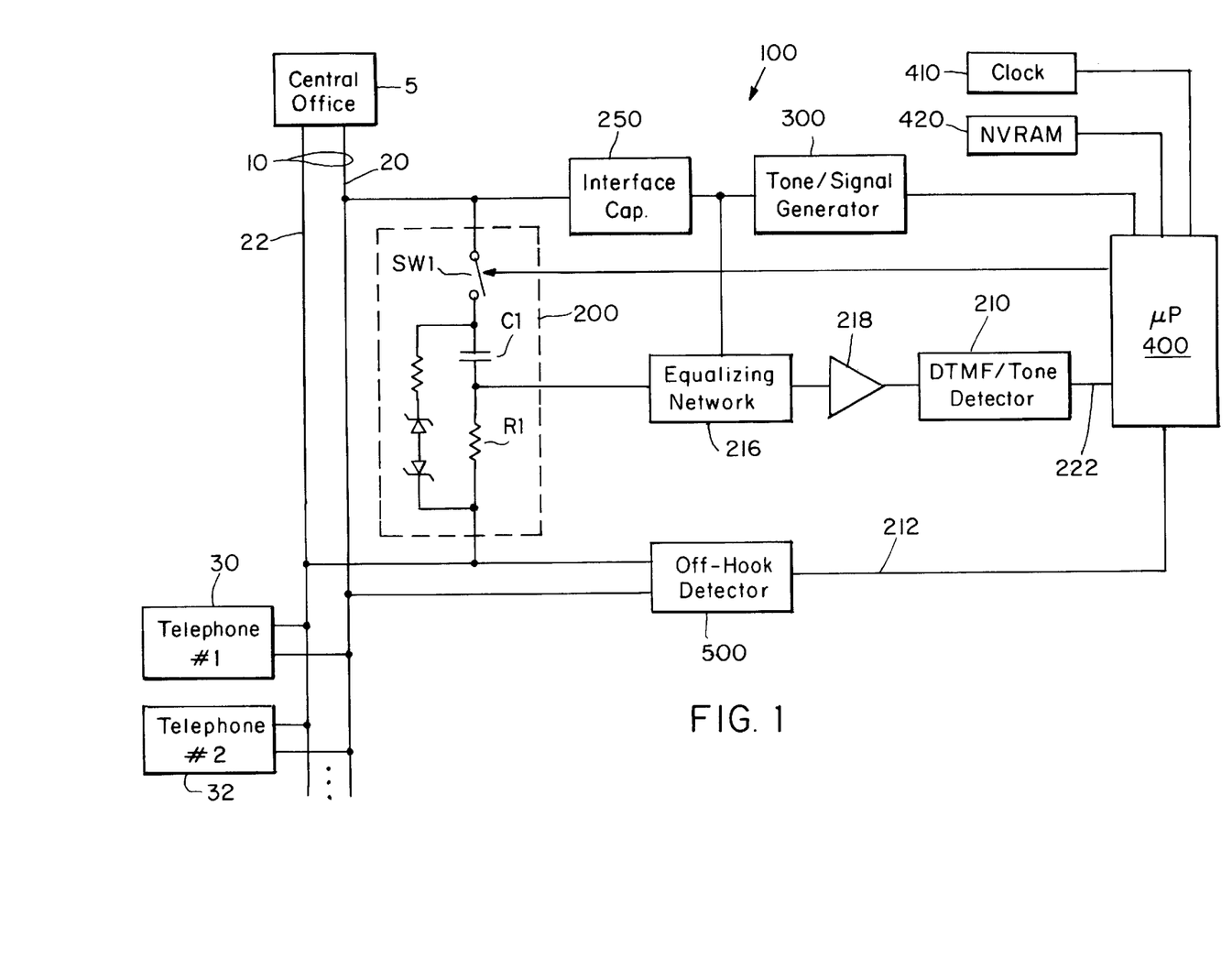
FIG. 1 is a block diagram of a parallel-connected data transfer system for a telephone link including a device for inhibiting transmission of dialing signals to a central office while allowing detection of the signals according to the present invention.

FIG. 1 is a block diagram of a parallel-connected data transfer system 100 for a telephone link 10, which has been constructed according to the principles of the present invention. The system 100 is controlled by a microprocessor 400 that operates by a clock signal from clock 410 and accesses data from or stores data to an optional nonvolatile RAM 420.

An off-hook detector 500 is connected to monitor tip and ring lines 20,22 of the telephone link 10. It provides an off-hook signal on signal path 212 to the microprocessor 400 in response to one of the telephones 30 or 32 going off-hook. The off-hook signal indicates to the microprocessor 400 that dialing and other a.c. signals may appear. The off-hook detector 500 additionally functions as a ring detector. Signal path 212 will vibrate in response to incoming ring signals to indicate to the microprocessor 400 that there is an incoming call.

A tone/signal generator 300 is constructed to generate at least DTMF-type dialing signals under the control of the microprocessor 400. In some implementations, however, it may be desirable to additionally generate modem signals or other a.c. signals. The tone generator 300 is coupled to the tip line 20 through an interfacing capacitor 250.

A switchable a.c. load 200 is selectively connectable across the tip 20 and ring lines 22 of the telephone link 10 to severely attenuate signals sent between the telephones 30, 32 and the central office 5. This operation is provided by a relay SW1 that is under the control of the microprocessor 400. When the relay SW1 is closed by the microprocessor, a series connected capacitor C1 and resistor R1 provide a low impedance path between tip and ring. Resistor R1 and capacitor C1 are selected such hat DTMF signals, for example, generated by telephones 30 or 32 are attenuated to a level at which the central office 5 will not recognize the tones as valid.

An a.c. signal amplifier 218 transmits dialing signals on the phone link 10 to a DTMF/tone detector 210. Two potential signal paths from the tip line 20 to the detector 210 via the amplifier are provided. The DTMF/tone detector 210 is continuously connected to tip through the interfacing capacitor 250, an equalizing network 216, and a.c. signal amplifier 218. Using the shared capacitor 250 for the tone/signal generator 300 and the DTMF/tone detector 210 decreases residual loading caused by the connection of the system 100 to the telephone link 10. This ensures that the audio volume of the link is not seriously reduced by the system 100. When the relay SW1 is in a closed position, the voltage across a resistor R1 is applied through the equalizing network 216 to the a.c. signal amplifier 218. The equalizing network 216 functions to ensure that, regardless of the relay's state, the amplitude of DTMF signals from telephones 30,32 presented to the a.c. signal amplifier 218 is substantially the same and detected by detector 210.

The attenuation provided by the switchable a.c. load 200 must be at least 30 dB to ensure that the central office 5 will not respond under most line conditions, although an attenuation of at least 38 dB is required to work under a broader spectrum of situations. To achieve the attenuation, the switchable a.c. load 200 comprises the microprocessor controlled relay SW1 and a 0.22 ohm resistor R1 in series with a 220 $\mu$F non-polarized capacitor C1. The capacitor C1 ensures that d.c. (direct current) voltage supplied by the central office 5 across tip and ring is unaffected once the capacitor C1 has reached a steady-state d.c. condition.

The selection of the resistor R1 and capacitor C1 is driven by the following analysis. The signaling chapter of "BOC Notes on the LEC Network—1990" states that a central office DTMF receiver should register DTMF digits with a power per frequency of −25 to 0 dBm. The receiver should not respond if either frequency component of the signal is below −55 dBm into 900 ohms. Thus, the receiver is required to deal with a minimum range of 25 dB per tone and is not allowed to permit a range of 55 dB per tone.

The specifications are reflected in commercially available DTMF receiver chips. The Mitel MT8870D integrated DTMF receivers are claimed to be "central office quality"; and they accept a DTMF low group or high group tone of −29 to +1 dBm. The Mitel MT3170B family of wide dynamic range DTMF receivers are suitable for end-to-end signaling; and a valid input signal level is from −50 to 0 dBm for either of the two DTMF tones. It is unclear whether any central office switches ever use such a sensitive DTMF receiver, but there is no guarantee that they are never used.

Thus, a typical central office DTMF receiver will detect amplitudes over at least a 30 dB range per frequency, and some DTMF receivers may detect amplitudes over a range of as high as 50 to 54 dB. AT&T central office switches typically reject DTMF tones less than −38.2 dBm per tone. A parallel dialer, or other parallel device of the present invention, is designed in view of the above specifications to prevent DTMF tones from being detected at the central office.

Further, it is typically not known whether a given telephone will be on the high end or low end of its permitted signal strength and it is typically not known exactly how the telephone link and central office circuitry will affect the DTMF signal. The parallel device might, for instance, be in a situation with a strong signal source, low-attenuation local loop, and high-sensitivity DTMF receiver. The parallel device should be designed to work over the highest practical range of situations. As a result, an attenuation of at least 30 dB is necessary to enable operation under most circumstances. At least a 38 dB attenuation will ensure operation with AT&T central office switches.

Simply selecting a very high attenuation, however, is not a satisfactory solution. If relay SW1 is closed, increasing attenuation has the undesirable effect of increasing the time required to detect that a phone has been hung up. This effect limits the maximum attenuation.

In the preferred approach implemented in FIG. 1, the goal is to attenuate all frequencies in the high frequency group of the DTMF signals by at least 45 dB. The worst case occurs for the DTMF frequency of 1209 Hz, the lowest high-band DTMF frequency. At this frequency, one commercially available non-polarized 220 $\mu$F capacitor C1 has an equivalent series resistance of at most 0.8 ohms and a frequency-dependent impedance of 0.6 ohms. Accounting for the resistance from relay SW1, from the one-foot phone cable connecting the dialer to the phone jack, and from any stray circuit and component resistances, resistor R1 should have a resistance of approximately 0.22 ohms. Clearly, the size of resistor R1 and capacitor C1 can be varied but the total amplitude of the complex impedance of the dialer and its cable should be kept below 1.36 ohms to achieve 45 dB attenuation in the closed-relay condition.

It is important to point out that the length of the cable and telephone wiring connecting the dialer to the path between the off-hook phone and the central telephone office does affect the attenuation, since a longer path generates higher resistance and lower attenuation. Consequently, the best place to put the dialer is normally at the modular jack nearest the place where the phone wiring enters the premises. This is often not required, depending on other factors like the length of the wiring in the home, the strength of the DTMF generators in the phones, the attenuation of the path to the central telephone office, and the sensitivity of the central office DTMF receiver. In any event, even when connecting at this point is required, it is normally much easier than a series connection.

In one embodiment, the system 100 is configured to operate as a store and forward dialer. The goal of this operation is to provide the required functionality yet maximize the transparency to the user. One aspect of transparency is ensuring that the dial-tone, the tone that one typically hears when the telephone receiver is first picked-up, is not attenuated by the system 100. The a.c. load 200 will, however, attenuate this tone when the relay SW1 is closed. Therefore, the relay SW1 should only be closed when the system 100 begins to detect the first DTMF signal from the off-hook telephone. Closing the relay at this point will stop the dial tone as is typical. A problem arises in that to properly load the phone link 10 to ensure that the central office 5 does not respond to the telephone-generated dialing signals, resistor R1 is small and capacitor C1 is large, resulting in a low impedance. If the premises' phones had been on-hook long enough to discharge voltage on capacitor C1 to near zero, some time will be required to recharge the capacitor C1 once the a.c. load 200 has been connected across the phone link. At the start of this time only a small d.c. voltage will appear across the tip and ring conductors of the off-hook phone. While the d.c. voltage is low, the phone may be unable to generate DTMF signals, which may leave an insufficient time to detect the two tones of the DTMF signals.

The time required to adequately charge the capacitor C1 can be estimated. In the preferred embodiment, capacitor C1 is approximately 220 $\mu$F. When the relay SW1 is closed, C1 is charged from the central telephone office battery (typically 50 volts DC) through the phone line's resistance of typically 400 to 2000 ohms, resulting in a time constant of 88 to 440 milliseconds. The time required for capacitor C1 to charge to a high enough voltage to permit DTMF generation is typically about one-sixth of this time constant, or about 74 milliseconds maximum.

Figure 2:
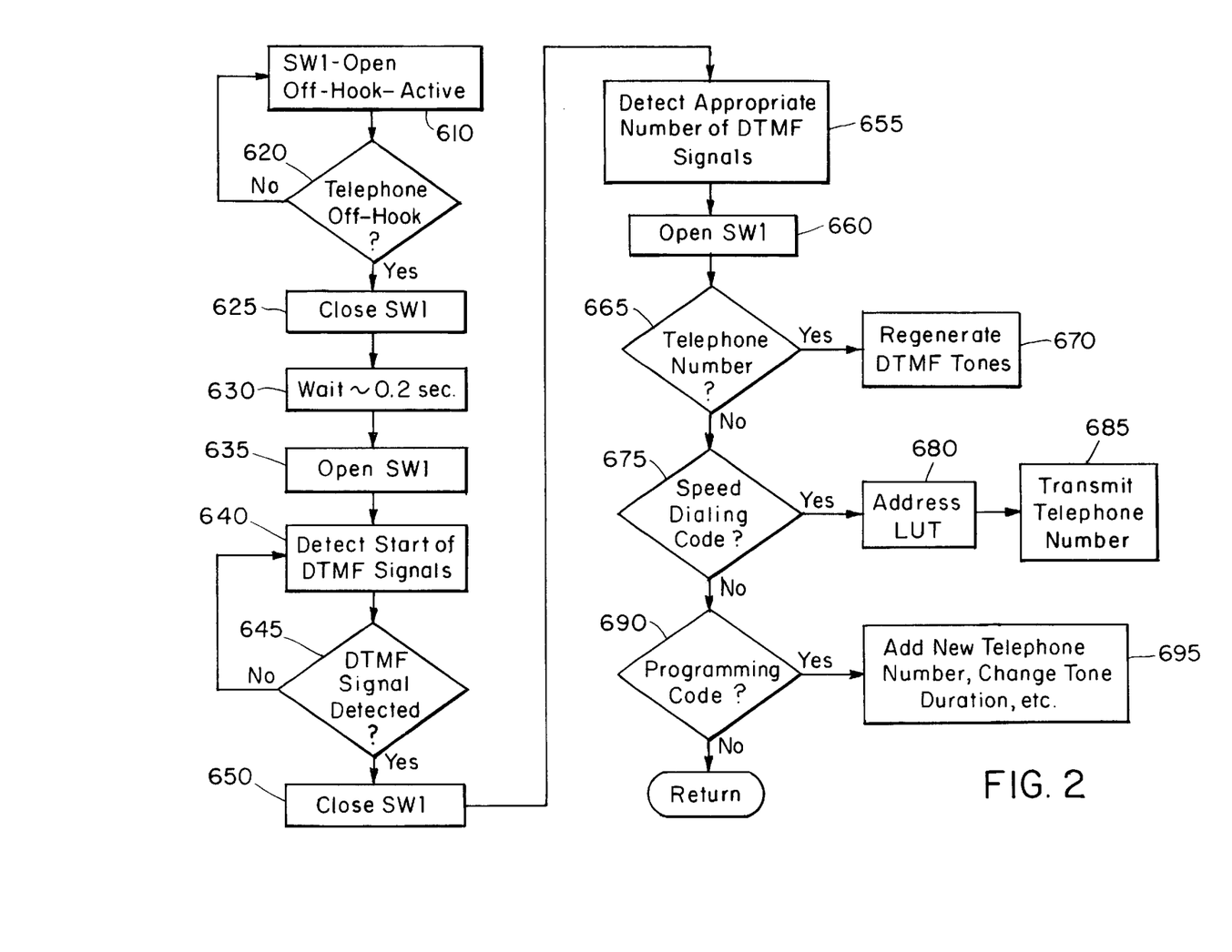
FIG. 2 is a flow diagram illustrating a method of operation of the inventive system.

FIG. 2 illustrates a method of operation of the invention when operating as a store and forward dialer, which solves the identified problems. According to the invention, in an initial state, the relay SW1 is in an open condition but the off-hook detector 500 is active to determine when one of the telephones 30 or 32 goes to an off-hook condition, step 610. This represents a standby mode in which the system 100 is essentially dormant.

When one of the phones is off-hook, the off-hook detector 500 sends an off-hook signal to the microprocessor 400 via signal path 212, in step 620. The microprocessor 400 immediately responds by closing relay SW1, step 625. The microprocessor holds the relay SW1 closed for at least 74 millisecond, but preferably 200 milliseconds, in step 630. Then after the expiration of this time period, the relay SW1 is opened, step 635. Transparency is provided by the fact that the dial tone is only blanked for the first 200 milliseconds after a user picks up the telephone's receiver. It is assumed that the typical user would normally not care whether the dial tone was blanked for this period. It is further assumed that during this short capacitor charging period, the typical operator will not yet have begun dialing.

The connection and disconnection in steps 625, 630, and 635 charges the capacitor C1 to ensure that a sufficient voltage drop will be present across the off-hook phone during DTMF signaling to enable the generation and identification of those signals.

Alternatively, the relay SW1 does not need to be opened in step 635. The DTMF detector 210 can of course detect any DTMF signals across resistor R1 when the relay is closed. With the relay SW1 closed, however, the dial tone will also be attenuated by the a.c. load 200.

In step 640, the DTMF detector 210 waits for DTMF dialing signals to appear across the telephone link 10. Any signals will reach the DTMF detector 210 through the interfacing capacitor 250 and the equalizing network 216 in step 640; no signals reach the detector through the capacitor C1 since relay SW1 is open.

When the microprocessor 400 is provided with an indication of a DTMF signal on conductor 222 from the DTMF detector 210 in step 645, the microprocessor 400 quickly closes the relay SW1 in step 650. This places the a.c. load 200 on the tip line which attenuates the DTMF signals to a level at which the central office 5 will not respond. This relay closing must occur quickly to ensure that the central office 5 does not interpret the signal as a valid DTMF signal. "BOC Notes on the LEC Network—1990" states that a DTMF receiver must reject a DTMF tone that is less than 23 milliseconds; so the capacitor C1 must be switched across the phone link in less than this time. Once capacitor C1 is switched in, it will dramatically reduce the amplitude of the a.c. signal sent to the central office's DTMF receiver. Since capacitor C1 has been precharged, its DC voltage will not lower the off-hook phone's voltage enough to prevent DTMF dialing. Even short DTMF signals can be detected across a load resistor R1 of the a.c. load 200 by the DTMF signal detector 210. Therefore, the preferred embodiment, without changing the apparent operation of the phone, ensures that the first DTMF signal does not reach the central office 5.

As subsequent dialing signals are generated by the off-hook telephone, they are consecutively detected and stored in the microprocessor 400, step 655. Then, once the microprocessor 400 has detected a suitable sequence of DTMF dialing signals, the relay SW1 is opened, step 660. Now, system 100 can take one of three courses of action. First, if the number which was dialed is simply a valid telephone number that should be dialed as is, step 665, the microprocessor 400 regenerates the DTMF dialing signals on the tip line 20 by generating the appropriate tones through the tone generator 300, step 670.

Alternatively, if the detected DTMF tones represent a speed dialing code, step 675, the microprocessor 400 treats the tones as an address for a look-up table stored in the microprocessor's non-volatile RAM (NVRAM) 420, step 680. This address location stores the telephone number which the user wishes to dial. The microprocessor 400 consecutively sends the DTMF dialing signals encoding this telephone number through the tone generator 300, step 685.

The DTMF signals generated by the telephone can also be commands for programming the dialer, step 690. For example, if two pound signals (##) are first detected, followed by the digit S (7) for "Store", followed by a pound signal (#), followed by a first sequence "name" of two numbers, followed by a second pound signal (#), followed by a second sequence "number" of numbers, followed by a third pound signal, this can be an indication to store at the shorthand "name", the "number", in step 695. As a result, when the user enters in a dialing command like pound followed by the name followed by a second pound, the system 100 will speed dial the corresponding telephone number. Other programming commands can change the length of DTMF tones or the intervals between DTMF tones, or otherwise program information into the dialer.

Another application of the present inventive system is as a long distance carrier selector for intra-LATA (Local Access and Transport Areas) toll calls. Commonly, intra-LATA calls default to the local telephone company. However, many times the long distance carrier can provide a less expensive calling rate. These long distance carriers can be typically accessed by leading the telephone number with the access code of the desired long distance carrier—for instance, 10ATT. This requires a person to spend time and energy remembering and dialing extra digits.

According to the present invention, the microprocessor 400 receives the telephone number that the user dialed and analyzes it, as in steps 610–665. From this information, the system 100 makes the decision whether or not the call should default to the local telephone company or whether to route the call through an alternate carrier. In the case where the local telephone company is desired, the system simply regenerates the desired telephone number. When the long distance carrier is desired, the system first generates that carrier's access code, such as 10 ATT, followed by the DTMF signals corresponding to the desired telephone number, such as 1 followed by a 10 digit number.

Still another application of the system 100 is as a billing code generator. It is common for users to make credit card calls. This requires that the user first dial an access code or the "800" number of the long distance carrier. When connected to the carrier, the user dials the credit card number for billing purposes. Typically this is a fourteen digit code. The system 100 can be configured to automatically dial this number when some predetermined code is entered at the telephone key pad. As before, this code is not transmitted to the central office. The system receives the code while loading the tip line. Afterwards, the system generates the proper credit card number in response to the code.

The system 100 may also be used to restrict toll calls. In many situations, the owner of a telephone may want to provide telephone access but restrict the user from making certain toll calls and thus incur expenses on behalf of the owner. Telephone numbers beginning with certain area codes and/or international dialing prefixes should be blocked from reaching the central office. Local phone numbers with or without area codes, along with "800" toll-free numbers, should be passed through to the central office. The system 100 provides this functionality.

When operating as a toll call restrictor, the microprocessor 400 receives the telephone number that the user dials as in 610–665 of FIG. 2. A determination is then made as to whether the user should be allowed to place the call. Typically, if the phone number will result in charges to the telephone's owner, the number will not be forwarded to the central office 5. In other situations, it is possible that only international or "900" numbering will be blocked, probably where an employee-employer relationship exists. In the alternative case, when the phone number is one that the user may dial, the number is transmitted to the central office by the system 100 as described in step 670 of FIG. 2.

Figure 3:
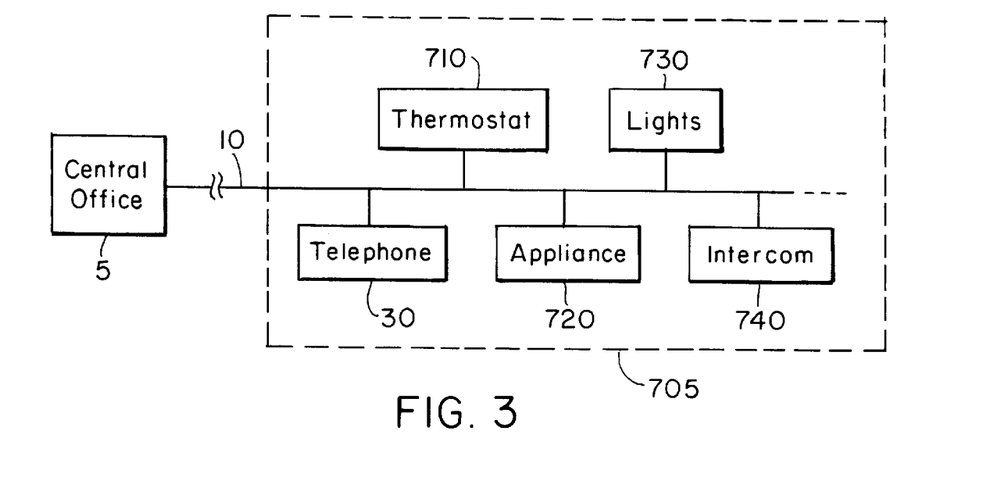
FIG. 3 illustrates an additional application for the inventive system, i.e., a device for transmitting information within a given telephone link to control home electronic devices or provide an intercom function.

Referring to FIG. 3, an additional application for the above-described inventive system is a device for transmitting data entirely within a given telephone link 10. In such a configuration, other home appliances 720, lights 730, thermostats 710, etc. are connected to the telephone wiring via telephone jacks in a home 705, for example. These connections are made via parallel-connected data transfer systems 100 as shown in FIG. 1. Then, by dialing with an off-hook telephone 30, a user can essentially call these other devices using only the home's wiring to issue commands to them. And as described previously, these dialing signals are attenuated to avoid action by the central office 5.

For example, to program thermostat 710, the user takes telephone 30 off-hook and dials a code that would be recognized by system 100 of the thermostat 710. The system 100 for thermostat 710 includes switchable a.c. load 200 and DTMF/tone detector 210 of FIG. 1. As a result, the dialing signals are blocked and not detected by the central office 5. They are, however, detected and interpreted by the thermostat 710 as signals for programming the thermostat. In this way, telephone wiring within someone's premises is used to send information from a telephone 30 or other DTMF-generating device to a DTMF-receiving device 710–740 on the premises 705. That receiving device 710-740 processes the DTMF information and possibly performs some function as adjusting the thermostat, turning lights on and off, or controlling appliances. In the alternative case where the user has dialed a telephone number, the appropriate signals are forwarded to the central office 5 as describe earlier.

A similar approach can be used to provide an intra-home intercom. This embodiment is designed to handle two modes of operation in each of two situations. The situations are: 1) where a telephone call is taking place on the telephone link 10 to another party via the central office 5; and 2) where a telephone call is not taking place.

In the first situation, a single or series of DTMF tone can be used to activate the intercom device 740 connected to the telephone wiring. These tones may be attenuated by the intercom 740. This function is not critical here, however, since typically the central office 5 does not react to any tones once a call has been placed. The intercom 740 has one of two possible modes of operation. In response to the activating tones, prerecorded messages can be audibly reproduced at the intercom device 740. Such a message could be "Alecia, please come to the phone." In this mode, a number of messages are available; the tones select the one to be reproduced. Alternatively in the other mode, the a.c. signal associated with the conversation on the telephone link 10 can be audibly broadcast by the intercom 740. In this implementation, a predetermined sequence of tones is used to start the broadcast by the intercom 740. Then when the user wishes to terminate the operation of the intercom 740, another predetermined sequence of tones is entered.

The situation in which a call is not occurring is similar but with modification. Where, the prerecorded message mode is used, the intercom device 740 must attenuate the DTMF tones used to activate it. Otherwise, a call could unintentionally be placed. If the intercom device 740 is to audibly broadcast a conversation on the telephone link 10, the operation is slightly more complicated. Here again, DTMF tones used to signal the intercom 740 to begin broadcasting the conversation should be attenuated to avoid action by the central office. However, if all DTMF tones were attenuated in the usual fashion, an unpleasant dial tone would interfere with the communication. Thus, a single or few tones should be transmitted to the central office so that the dial tone is turned off.

Figure 4:
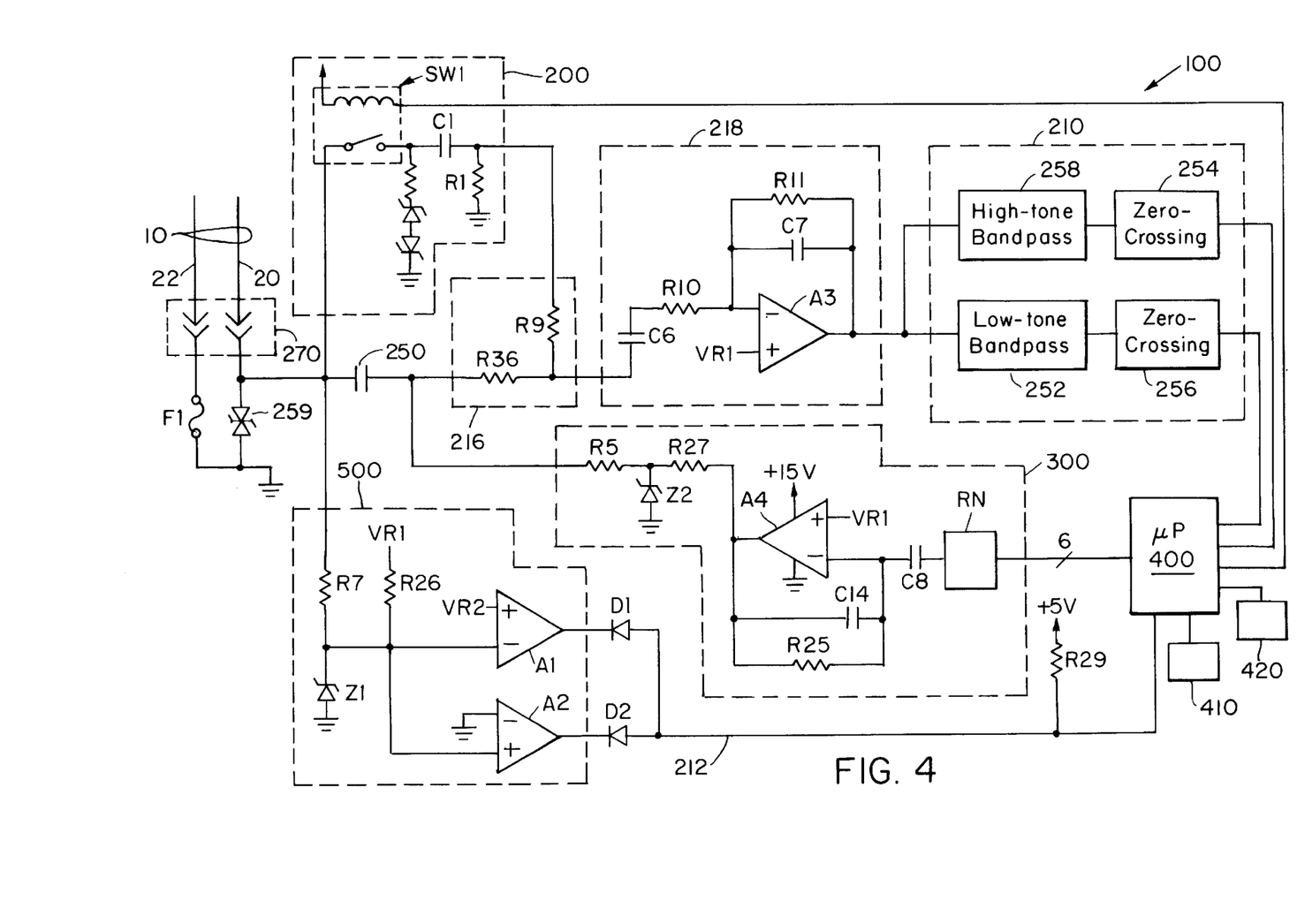
FIG. 4 is a circuit diagram of the data transfer system of FIG. 1.

FIG. 4 is a detailed circuit diagram of the inventive system 100 showing one possible configuration. Generally, the system 100 connects to the tip 20 and ring 22 lines via a telephone jack 270. Ring 22 is shown providing the reference potential throughout the circuit. Fuse F1 provides some protection for the circuit in the case of improper connection or a lightning strike on the phone line 10. A varistor 259 shorts out large voltage surges between the lines 20,22.

The off-hook detector 500 operates by sensing the voltage between the telephone link conductors tip 20 and ring 22. During on-hook conditions, the voltage across the telephone link 10 is approximately 50 Volts when the phone jack 270 is wired correctly, and approximately −50 volts when the wiring is reversed. Because some phone jacks are wired incorrectly, C1 is a non-polarized capacitor in the preferred embodiment. When a telephone goes off-hook, the voltage across tip 20 and ring 22 drops to a much lower voltage, typically about 10 volts. Comparator A1 compares a reference voltage VR2 received at a non-inverting input terminal (+) to a voltage at an inverting terminal (−) which is indicative of the voltage between tip and ring. Protective zener diode Z1 connects to the ring line 22, the circuit's reference potential. Resistances R7 and R26 are chosen such that the output of comparator A1 is a steady low when the voltage across tip and ring is indicative of a normal on-hook condition (i.e., tip positive with respect to ring) and a steady high when at least one of the phones is off-hook.

In cases of improper installation, the tip line 20 and ring line 20 may be reversed at jack 270. A second comparator A2 is provided to handle this situation. Specifically, the second comparator A2 compares the divided voltage of resistor R26 to the ring conductor 22. If the divided voltage remains negative, there is an on-hook condition with tip and ring lines crossed. The amplifier A2 indicates the condition by generating a negative output.

Diode D1 connects the output of comparator A1 to the microprocessor 400 and D2 connects the comparator A2 to the microprocessor 400. Resistor R29 provides a connection to +5 Volts, the result being a steady logic low input on line 212 to the microprocessor 400 if all phones are on-hook, and a steady logic high input if any phone is off-hook.

The off-hook detector 500 also facilitates ring detection. An incoming ring signal causes the line 212 to the microprocessor 400 to fluctuate in a characteristic way that the microprocessor 400 detects as an incoming ring.

The interfacing network 216 is designed to ensure that the voltage amplitude of a DTMF signal received by the a.c. amplifier 218 through capacitor C6 and resistor R10 is substantially the same whether or not the relay SW1 is in an open or closed condition. An additional consideration is the fact that resistor R36 should be large to minimize attenuation due to the dialer when relay SW1 is open, as for example, when parties are talking on the telephone link 10 and the system 100 is essentially inactive. The interfacing network 216 comprises resistors R9 and R36. Resistor R36 provides a connection between the tip line 20 and the a.c. amplifier 218 through the interfacing capacitor 250 when the relay SW1 is open. When the relay SW1 is closed, resistor R9 also connects the a.c. amplifier 218 to the tip line 20 via capacitor C1 of the a.c. load 200.

Figure 5A:
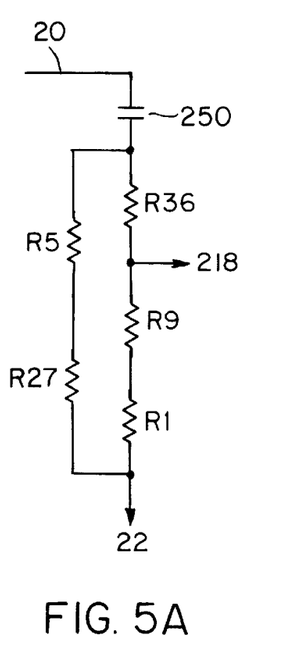
FIGS. 5A and 5B show the principle paths between tip and ring when the relay SW1 is open, FIG. 5A, and closed, FIG. 5B, to show the operation of the equalizing network.
Figure 5B:
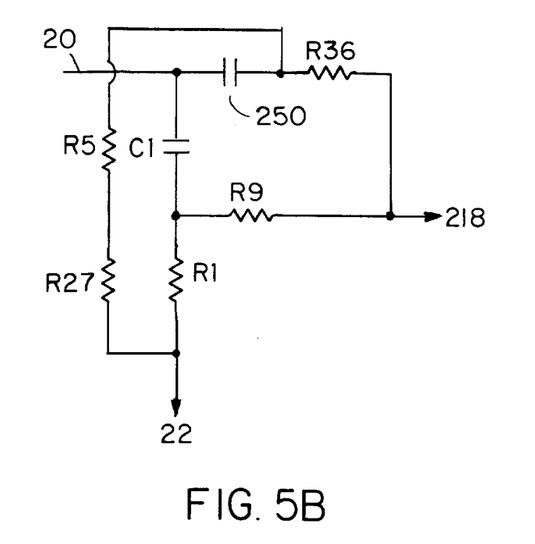

FIG. 5A is an equivalent circuit used to calculate the input signal entering the a.c. amplifier 218, at capacitor C6, when the relay SW1 is open. R5 connects through R27 to the output of an operational amplifier A4, which is an a.c. ground when the operational amplifier A4 is quiescent as it is when DTMF tones are being detected. The effect of R27 is negligible because its resistance is much lower than the resistance of resistor R5. The effect of C6 and R10 is negligible since R10 is much greater than R9 plus R1. The effect of capacitor 250 is negligible because its impedance is much less than that of resistor R5. The effect of resistor R1 is negligible because it is much smaller than R9. FIG. 5B is an equivalent circuit when relay SW1 is closed. Here the effect of resistor R36, resistor R5, and capacitor 250 is negligible since R36 is much greater than the series impedance of C1 and R9. The effect of R9 is negligible because it is much smaller than resistor R10.

To ensure that the amplitude of the DTMF signals received at the a.c. amplifier 218 are substantially the same regardless of the state of relay SW1, a simplifying assumption is made that the DTMF generator on the telephone link 10 may be modeled as an a.c. source with a series impedance of 600 ohms, and that this drives the phone line 10 modeled as a 600 ohm load as well as the dialer in parallel with the 600-ohm phone line. Assuming that R36 is much larger than R9, for the relay-open case of FIG. 5A, the input to a.c. amplifier 218 will be the DTMF tone's amplitude times this number K: K=(R9/R36)*RP/(RP+600), where RP is the resistance of three resistors in parallel –600 ohms, R5, and R36. K equals 0.000371 if R9 is 10 ohms, R36 is 11 Kohms, and R5 is 1527 ohms.

For FIG. 5B, if R1 is much less than 600 ohms, the input to the a.c. amplifier 218 will be the DTMF tone's amplitude times R1 divided by 600. If R1 is 0.22 ohms, this is 0.000367, which is close to the ratio 0.000371 for FIG. 5A. If these conditions are met, then the voltage supplied to the a.c. amplifier 218 should be substantially the same whether or not relay SW1 is open or closed.

The a.c. amplifier 218 comprises a comparator A3 that receives the signals from the interfacing network 216 at an inverting input terminal (–) through the series connected capacitor C6 and resistor R10. A non-inverting input terminal (+) receives a reference voltage VR1. Negative feedback is provided through a parallel connected capacitor C7 and resistor R11. The output terminal of comparator A3 of the a.c. amplifier 218 is connected the DTMF/tone detector 210.

The DTMF/tone detector 210 can be easily realized in an integrated circuit. The preferred embodiment, however, has two bandpass filters 252,258, one for the low DTMF group and one for the high group. The output of each filter is fed into a separate zero-crossing detector 254,256 with hysteresis. The output of each of these zero-crossing detectors is fed into the microprocessor 400, which counts zero crossings and analyzes the results. This approach reduces costs and allows the same filters to be used for other a.c. signal analysis, such as detection of dial tones and other call progress tones such as a long distance company's computer-generated tones from its switches.

In more detail, a high-tone bandpass filter 258 and the low-tone bandpass filter 252 receive the output of the a.c. amplifier 218. The high-tone bandpass filter 258 isolates the high tones of the DTMF signals. Possibly, this filter is an active bandpass filter. The low-tone bandpass filter 252 may also be an active type filter and isolates the low tones of the DTMF signals. The outputs from the high-tone bandpass filter 258 and the low-tone bandpass filter 252 are fed into separate zero-crossing detectors 254 and 256, respectively. Both zero-crossing detectors 254 and 256 have hysteresis for noise immunity. The outputs of the detectors 254 and 256 are sampled by the microprocessor 400. By analyzing the intervals between zero crossings of both the high-tones and the low-tones of the DTMF signals on the tip line 20, the microprocessor 400 discriminates the different frequencies in signals.

The tone/signal generation circuit 300 is basically a summing amplifier with high-frequency rolloff. It comprises a resistor network RN, blocking capacitor C8 and an amplifier A4 with feedback resistor R25 and capacitor C14. The microprocessor 400 generates 6-bit digital representations of a wave form having the desired frequency make up such as, for example, a dual-tone multi-frequency dialing signal. This 6-bit digital value is converted to the actual a.c. signal by tone/signal generation circuit 300 that acts as a summing amplifier of the weighted 6-bit samples, with the lowest order bit having the lowest weight, the second lowest order bit having twice the weight of the lowest order bit, etc., with each higher order bit having twice the weight of the bit below it in significance. The resulting a.c. current is amplified by amplifier A4 by an amount proportional to R25, and rolled off for high frequencies by capacitor C14. The output of comparator A4 is connected to the tip line 20 via resistors R27 and R5 through the interfacing capacitor 250. Zener diode Z2 and resistor R27 are provided to help protect amplifier A4 from large, fast transitions of the tip-ring voltage.

The effect of the system 100 on the audio quality of telephone link 20 should be minimized. This goal is facilitated by making the impedance from the series elements R5, R27, and capacitor 250 as large as possible, but this large impedance makes it more difficult for the amplifier A4 to generate sufficiently large dialing signals. As a result, the supply voltage of the comparator A4 is a full 15 Volts, and this feature allows large voltage outputs to counter the effects of the intentionally large series impedance.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A parallel-connected dialing signal detection and transmission-inhibiting device, comprising:
   a detector for identifying dual-tone multifrequency dialing signals across the tip and ring conductors of a telephone link;
   a load that connects across the tip and ring conductors to attenuate the dialing signals by at least 30 dB;
   a controller for controlling a call and the connection of the load in response to the identified dialing signals; and
   an equalizing network for facilitating detection of the dial signals by the detector when the load is connected across the tip and ring conductors and when the load is not connected across the tip and ring conductors.

2. A device as described in claim 1, wherein the equalizing network reduces a magnitude of the dialing signals when the load is connected across the tip and ring conductors.

3. A dialing signal detection and transmission-inhibiting method for a telephone call control device, comprising:
   connecting the telephone call control device in parallel with telephones on a telephone link;
   identifying dual-tone multifrequency dialing signals appearing across tip and ring conductors of the telephone link;
   attenuating the dialing signals by at least 30 dB to prevent a response by a central office,
   controlling a call by identifying the dialing signals; and
   adjusting a level of the dialing signals received by a detector in response to attenuation.

4. A method for inhibiting transmission of dialing signals on a telephone link to a central office, the method comprising:
   charging a capacitor of an a.c. load, which is connected across tip and ring conductors of the telephone link;
   after charging, detecting dialing signals on the telephone link from a telephone; and
   attenuating the dialing signals by connecting the charged a.c. load to the telephone link to prevent action by the central office in response to the dialing signals.

5. A method as described in claim 4, further comprising:

accessing a list of speed-dialing numbers in response to the detected dialing signals;

determining a telephone number indicated by the dialing signals; and transmitting dialing signals corresponding to the telephone number to a central office controlling the telephone link.

6. A method as described in claim 5, further comprising:

selecting a telephone carrier in response to a telephone number encoded in the dialing signals; and forwarding the telephone number to the selected telephone carrier.

7. A method as described in claim 5, further comprising preceding the telephone number with an access code of the selected telephone carrier.

8. A method as described in claim 5, further comprising:

determining whether a telephone number encoded by the dialing signals is allowed; and forwarding the dialing signals to the central office only if the telephone number is allowed.

9. A method as described in claim 4, wherein the step of charging the capacitor comprises connecting the capacitor to a d.c. voltage that has the same polarity as the telephone link to which the capacitor will be connected.

* * * * *